(12) United States Patent  
Marett et al.

(10) Patent No.: US 8,265,605 B2  
(45) Date of Patent: Sep. 11, 2012

(54) SERVICE ESCROWED TRANSPORTABLE WIRELESS EVENT REPORTING SYSTEM

(75) Inventors: Michael A. Marett, Kennesaw, GA (US); Edward I. Comer, Brevard, NC (US)

(73) Assignee: Numerex Corp., Atlanta, GA (US)

( * ) Notice: Subject to any disclaimer, the term of this patent is extended or adjusted under 35 U.S.C. 154(b) by 1159 days.

(21) Appl. No.: 12/012,848

(22) Filed: Feb. 6, 2008

(65) Prior Publication Data

US 2008/0287109 A1   Nov. 20, 2008

Related U.S. Application Data

(60) Provisional application No. 60/899,780, filed on Feb. 6, 2007.

(51) Int. Cl.
```
H04M 3/42      (2006.01)
G08B 23/00     (2006.01)
G08B 29/00     (2006.01)
G08B 21/00     (2006.01)
G08B 13/00     (2006.01)
G08B 13/08     (2006.01)
```

(52) U.S. Cl. ............ 455/414.1; 340/500; 340/506; 340/540; 340/541; 340/546

(58) Field of Classification Search ............ 455/414.1; 340/500, 501, 506, 540, 541.546  
See application file for complete search history.

(56) References Cited

U.S. PATENT DOCUMENTS

| | | | |
|---|---|---|---|
| 3,581,019 A | 5/1971 | Ryan | 179/41 |
| 3,886,515 A | 5/1975 | Cottin et al. | 340/23 |
| 3,973,200 A | 8/1976 | Akerberg | 325/55 |
| 4,172,969 A | 10/1979 | Levine et al. | 179/2 EC |
| 4,219,698 A | 8/1980 | Birilli et al. | 179/5 P |
| 4,263,480 A | 4/1981 | Levine | 179/2 EC |
| 4,284,849 A | 8/1981 | Anderson et al. | 179/5 R |
| 4,342,986 A | 8/1982 | Buskirk et al. | 340/539 |
| 4,361,730 A | 11/1982 | Barber et al. | 179/5 R |
| 4,371,751 A | 2/1983 | Hilligoss, Jr. et al. | 179/5 R |
| 4,412,292 A | 10/1983 | Sedam et al. | |
| 4,454,027 A | 6/1984 | Fenton | 208/253 |
| 4,486,624 A | 12/1984 | Puhl et al. | 179/2 EB |
| 4,492,820 A | 1/1985 | Kennard et al. | 179/5 P |
| 4,644,347 A | 2/1987 | Lucas et al. | 340/825.04 |
| 4,644,351 A | 2/1987 | Zabarsky et al. | 340/825.44 |

(Continued)

FOREIGN PATENT DOCUMENTS

EP   0 123 456 A2   10/1984

(Continued)

OTHER PUBLICATIONS

EIA/TIA 1S-54-B Standard; p. 115 and pp. 215-222.

(Continued)

*Primary Examiner* — Nathan Mitchell

(74) *Attorney, Agent, or Firm* — King & Spalding

(57) ABSTRACT

A portable service escrowed event reporting system that may be sold through mass-market sales channels. Communications between a consumer and the provider of the event reporting system are not required in advance of the system being purchased by the consumer. After purchase of the system by the consumer, the system may be initialized. The service may have a finite amount of service associated with it when it is purchased. The consumer may choose to have the system report the occurrence of reportable events directly to them over a wireless network.

34 Claims, 4 Drawing Sheets

U.S. PATENT DOCUMENTS

| | | | |
|---|---|---|---|
| 4,646,082 A | 2/1987 | Engel et al. | 340/825.54 |
| 4,677,653 A | 6/1987 | Weiner et al. | 379/58 |
| 4,724,425 A | 2/1988 | Gerhart et al. | 340/539 |
| 4,734,928 A | 3/1988 | Weiner et al. | 379/59 |
| 4,750,197 A | 6/1988 | Denekamp et al. | 379/58 |
| 4,766,548 A | 8/1988 | Cedrone et al. | 364/479 |
| 4,783,747 A | 11/1988 | Komori et al. | |
| 4,791,658 A | 12/1988 | Simon et al. | 379/41 |
| 4,807,225 A | 2/1989 | Fitch | 370/71 |
| 4,814,763 A | 3/1989 | Nelson et al. | 340/825.44 |
| 4,823,123 A | 4/1989 | Siwiak | 340/825.44 |
| 4,825,193 A | 4/1989 | Siwiak et al. | 340/311.1 |
| 4,825,457 A | 4/1989 | Lebowitz | 379/40 |
| 4,833,701 A | 5/1989 | Comroe et al. | 379/60 |
| 4,837,800 A | 6/1989 | Freeburg et al. | 379/59 |
| 4,839,917 A | 6/1989 | Oliver | 379/45 |
| 4,866,445 A | 9/1989 | Valero et al. | 341/106 |
| 4,868,560 A | 9/1989 | Oliwa et al. | 340/825.44 |
| 4,868,859 A | 9/1989 | Sheffer | 379/39 |
| 4,875,038 A | 10/1989 | Siwiak et al. | 340/825.44 |
| 4,875,230 A | 10/1989 | Blair | 379/63 |
| 4,882,579 A | 11/1989 | Siwiak | 340/825.44 |
| 4,887,290 A | 12/1989 | Dop et al. | 379/33 |
| 4,887,291 A | 12/1989 | Stillwell | 379/39 |
| 4,890,315 A | 12/1989 | Bendixen et al. | 379/59 |
| 4,891,637 A | 1/1990 | Siwiak et al. | 340/825.44 |
| 4,891,638 A | 1/1990 | Davis | 340/825.44 |
| 4,901,340 A | 2/1990 | Parker et al. | 379/60 |
| 4,905,234 A | 2/1990 | Childress et al. | 370/94.1 |
| 4,914,651 A | 4/1990 | Lusignan | 370/69.1 |
| 4,928,096 A | 5/1990 | Leonardo et al. | 340/825.44 |
| 4,940,963 A | 7/1990 | Gutman et al. | 340/313 |
| 4,972,460 A | 11/1990 | Sasuta | 379/60 |
| 4,979,169 A | 12/1990 | Almond et al. | 370/99 |
| 4,993,059 A | 2/1991 | Smith et al. | 379/39 |
| 5,005,014 A | 4/1991 | Jasinski | 340/825.44 |
| 5,010,584 A | 4/1991 | Seki | 455/83 |
| 5,020,091 A | 5/1991 | Krolopp et al. | 379/58 |
| 5,020,093 A | 5/1991 | Pireh | 379/59 |
| 5,027,383 A | 6/1991 | Sheffer | 379/39 |
| 5,029,098 A | 7/1991 | Levasseaur | |
| 5,031,204 A | 7/1991 | McKernan | 379/63 |
| 5,047,763 A | 9/1991 | Kuznicki et al. | 340/825.44 |
| 5,073,919 A | 12/1991 | Hagensick | 379/29 |
| 5,081,667 A | 1/1992 | Drori et al. | 379/59 |
| 5,087,919 A | 2/1992 | Odagawa et al. | 342/357 |
| 5,090,051 A | 2/1992 | Muppidi et al. | 379/61 |
| 5,117,449 A | 5/1992 | Metroka et al. | 379/58 |
| 5,121,503 A | 6/1992 | Davis | 455/12.1 |
| 5,124,697 A | 6/1992 | Moore | 340/825.44 |
| 5,131,019 A | 7/1992 | Sheffer et al. | 379/39 |
| 5,134,644 A | 7/1992 | Garton et al. | 379/39 |
| 5,142,279 A | 8/1992 | Jasinski et al. | 340/825.44 |
| 5,148,473 A | 9/1992 | Freeland et al. | 379/59 |
| 5,153,582 A | 10/1992 | Davis | 340/825.44 |
| 5,153,902 A | 10/1992 | Buhl et al. | 379/57 |
| 5,153,903 A | 10/1992 | Eastmond et al. | 379/57 |
| 5,159,625 A | 10/1992 | Zicker | 379/59 |
| 5,162,790 A | 11/1992 | Jasinski | 340/825.44 |
| 5,173,933 A | 12/1992 | Jabs et al. | 379/58 |
| 5,175,758 A | 12/1992 | Levanto et al. | 379/57 |
| 5,185,779 A | 2/1993 | Dop et al. | 379/33 |
| 5,196,842 A | 3/1993 | Gomez et al. | 340/825.44 |
| 5,206,855 A | 4/1993 | Schwendeman et al. | 370/50 |
| 5,207,784 A | 5/1993 | Schwartzendruber | |
| 5,208,756 A | 5/1993 | Song | 364/449 |
| 5,210,787 A | 5/1993 | Hayes et al. | 379/60 |
| 5,218,367 A | 6/1993 | Sheffer et al. | 342/457 |
| 5,220,599 A | 6/1993 | Sasano et al. | 379/142 |
| 5,222,123 A | 6/1993 | Brown et al. | 379/57 |
| 5,230,081 A | 7/1993 | Yamada et al. | 455/33.1 |
| 5,239,294 A | 8/1993 | Flanders et al. | 340/825.44 |
| 5,239,678 A | 8/1993 | Grube et al. | 455/34.1 |
| 5,247,567 A | 9/1993 | Hirano | 379/61 |
| 5,254,986 A | 10/1993 | DeLuca | 340/825.44 |
| 5,255,307 A | 10/1993 | Mizikovsky | 379/58 |
| 5,265,150 A | 11/1993 | Helmkamp et al. | 379/58 |
| 5,278,539 A | 1/1994 | Lauterbach et al. | 340/539 |
| 5,278,890 A | 1/1994 | Beeson, Jr. et al. | 379/57 |
| 5,305,217 A | 4/1994 | Nakamura et al. | 364/242.02 |
| 5,307,399 A | 4/1994 | Dai et al. | 379/57 |
| 5,307,509 A | 4/1994 | Michalon et al. | 455/54.1 |
| 5,335,278 A | 8/1994 | Matchett et al. | 380/23 |
| 5,341,410 A | 8/1994 | Aron et al. | 379/59 |
| 5,363,427 A | 11/1994 | Ekstrom et al. | 379/58 |
| 5,365,573 A | 11/1994 | Sakamoto et al. | 379/61 |
| 5,369,681 A | 11/1994 | Boudreau et al. | 379/87 |
| 5,371,781 A | 12/1994 | Ardon | 379/59 |
| 5,371,898 A | 12/1994 | Grube et al. | 455/33.1 |
| 5,382,970 A | 1/1995 | Kiefl | 348/1 |
| 5,386,209 A | 1/1995 | Thomas | 340/539 |
| 5,396,537 A | 3/1995 | Schwendeman | 379/57 |
| 5,396,539 A | 3/1995 | Slekys et al. | 379/59 |
| 5,398,277 A | 3/1995 | Martin, Jr. et al. | 379/39 |
| 5,404,392 A | 4/1995 | Miller et al. | 379/60 |
| 5,432,841 A | 7/1995 | Rimer | 379/59 |
| 5,450,329 A | 9/1995 | Tanner | 364/449 |
| 5,453,730 A | 9/1995 | De-Grinis et al. | |
| 5,454,027 A | 9/1995 | Kennedy et al. | 379/60 |
| 5,493,722 A | 2/1996 | Gunn et al. | 455/54.1 |
| 5,502,761 A | 3/1996 | Duncan et al. | 379/142 |
| 5,511,072 A | 4/1996 | Delprat | 370/68.1 |
| 5,511,110 A | 4/1996 | Drucker | 379/57 |
| 5,517,547 A | 5/1996 | Ladha et al. | 379/40 |
| 5,519,756 A | 5/1996 | Clift | 379/44 |
| 5,526,401 A | 6/1996 | Roach, Jr. et al. | 379/59 |
| 5,528,664 A | 6/1996 | Slekys et al. | 379/58 |
| 5,530,736 A | 6/1996 | Comer et al. | 379/58 |
| 5,533,094 A | 7/1996 | Sanmugam | 379/57 |
| 5,539,810 A | 7/1996 | Kennedy, III et al. | 379/59 |
| 5,544,223 A | 8/1996 | Robbins et al. | 379/58 |
| 5,544,225 A | 8/1996 | Kennedy, III et al. | 379/59 |
| 5,546,444 A | 8/1996 | Roach, Jr. et al. | 379/59 |
| 5,574,975 A | 11/1996 | Hill | 455/51.2 |
| 5,579,372 A | 11/1996 | Åström | 379/58 |
| 5,586,177 A | 12/1996 | Farris et al. | 379/230 |
| 5,594,740 A | 1/1997 | LaDue | 379/59 |
| 5,594,945 A | 1/1997 | Lewis et al. | 455/38.1 |
| 5,596,573 A | 1/1997 | Bertland | 370/474 |
| 5,603,091 A | 2/1997 | Linquist et al. | 455/56.1 |
| 5,610,973 A | 3/1997 | Comer | 379/59 |
| 5,619,209 A | 4/1997 | Horstein et al. | 342/352 |
| 5,625,889 A | 4/1997 | Chikkaswamy et al. | 455/67.1 |
| 5,629,975 A | 5/1997 | Tiedemann, Jr. et al. | 379/60 |
| 5,640,139 A | 6/1997 | Egeberg | 340/426 |
| 5,648,966 A | 7/1997 | Kondo et al. | 370/245 |
| 5,652,564 A | 7/1997 | Winbush | |
| 5,652,570 A | 7/1997 | Lepkofker | 340/573 |
| 5,675,371 A | 10/1997 | Barringer | 348/6 |
| 5,678,179 A | 10/1997 | Turcotte et al. | 455/331 |
| 5,680,551 A | 10/1997 | Martino, II | 395/200.15 |
| 5,684,858 A | 11/1997 | Hartmann et al. | 379/40 |
| 5,686,888 A | 11/1997 | Welles, II et al. | 340/539 |
| 5,701,302 A | 12/1997 | Geiger | 370/521 |
| 5,722,067 A | 2/1998 | Fougnies et al. | 455/406 |
| 5,742,668 A | 4/1998 | Pepe et al. | 379/58 |
| 5,742,905 A | 4/1998 | Pepe et al. | 455/461 |
| 5,745,867 A | 4/1998 | Mills | 701/207 |
| 5,748,104 A | 5/1998 | Argyroudis et al. | 340/870.11 |
| 5,751,789 A | 5/1998 | Farris et al. | 379/34 |
| 5,754,954 A | 5/1998 | Cannon et al. | 455/419 |
| 5,758,313 A | 5/1998 | Shah et al. | 701/208 |
| 5,761,621 A | 6/1998 | Sainton | 455/453 |
| 5,767,788 A | 6/1998 | Ness | 340/825.49 |
| 5,768,343 A | 6/1998 | Dame et al. | 379/33 |
| 5,777,605 A | 7/1998 | Yoshinobu et al. | 345/173 |
| 5,781,612 A | 7/1998 | Choi et al. | 379/58 |
| 5,787,149 A | 7/1998 | Yousefi et al. | 379/59 |
| 5,787,357 A | 7/1998 | Salin | 455/466 |
| 5,790,631 A | 8/1998 | Minarczik et al. | 379/2 |
| 5,793,306 A | 8/1998 | Vershinin et al. | |
| 5,794,144 A | 8/1998 | Comer et al. | 455/426 |
| 5,797,097 A | 8/1998 | Roach, Jr. et al. | 455/456 |
| 5,805,997 A | 9/1998 | Farris | 455/461 |
| 5,819,184 A | 10/1998 | Cashman | 455/553 |
| 5,822,221 A | 10/1998 | Groenteman | 364/550 |
| 5,822,423 A | 10/1998 | Jehnert et al. | 379/352 |

| | | | |
|---|---|---|---|
| 5,826,195 A | 10/1998 | Westerlage et al. ............ 455/456 |
| 5,835,868 A | 11/1998 | McElroy et al. |
| 5,844,808 A | 12/1998 | Konsmo et al. |
| 5,845,203 A | 12/1998 | LaDue ............................ 455/414 |
| 5,845,211 A | 12/1998 | Roach, Jr. ....................... 455/436 |
| 5,862,201 A | 1/1999 | Sands ................................ 379/26 |
| 5,862,480 A | 1/1999 | Wild et al. ...................... 455/432 |
| 5,862,481 A | 1/1999 | Kulkarni et al. ................ 455/432 |
| 5,873,043 A | 2/1999 | Comer ............................ 455/458 |
| 5,875,863 A | 3/1999 | Jarvis et al. .................... 180/65.4 |
| 5,878,351 A | 3/1999 | Alanara et al. .................. 455/466 |
| 5,884,216 A | 3/1999 | Shah et al. ...................... 701/207 |
| 5,889,474 A | 3/1999 | LaDue ........................ 340/825.49 |
| 5,898,917 A | 4/1999 | Batni et al. ...................... 455/564 |
| 5,901,142 A | 5/1999 | Averbuch et al. ............... 370/329 |
| 5,909,651 A | 6/1999 | Chander et al. ................. 455/466 |
| 5,913,166 A | 6/1999 | Buttitta et al. .................. 455/436 |
| 5,917,449 A | 6/1999 | Sanderford et al. ............. 342/457 |
| 5,917,886 A | 6/1999 | Halkio ............................... 379/37 |
| 5,918,172 A | 6/1999 | Saunders et al. ............... 455/404 |
| 5,920,822 A | 7/1999 | Houde et al. .................... 455/466 |
| 5,923,731 A | 7/1999 | McClure |
| 5,924,026 A | 7/1999 | Krishnan ......................... 455/414 |
| 5,933,784 A | 8/1999 | Gallagher et al. ............... 455/552 |
| 5,946,629 A | 8/1999 | Sawyer et al. .................. 455/466 |
| 5,946,630 A | 8/1999 | Willars et al. ................... 455/466 |
| 5,983,197 A | 11/1999 | Enta |
| 5,999,808 A | 12/1999 | LaDue ............................ 455/412 |
| 6,011,321 A | 1/2000 | Stancu et al. |
| 6,012,013 A | 1/2000 | McBurney ..................... 701/207 |
| 6,012,014 A | 1/2000 | Koyanagi et al. ............... 701/208 |
| 6,014,089 A | 1/2000 | Tracy et al. ................ 340/870.02 |
| 6,018,657 A | 1/2000 | Kennedy, III et al. ......... 455/426 |
| 6,021,394 A | 2/2000 | Takahashi |
| 6,025,774 A | 2/2000 | Forbes ............................ 340/426 |
| 6,026,345 A | 2/2000 | Shah et al. ...................... 701/117 |
| 6,032,037 A * | 2/2000 | Jeffers ......................... 455/404.1 |
| 6,049,273 A | 4/2000 | Hess ............................... 340/539 |
| 6,067,454 A | 5/2000 | Foti ................................. 455/433 |
| 6,070,070 A | 5/2000 | Ladue ............................. 455/419 |
| 6,072,862 A | 6/2000 | Srinivasan ................ 379/100.08 |
| 6,078,811 A | 6/2000 | Lin et al. ......................... 455/433 |
| 6,078,820 A | 6/2000 | Wells et al. ..................... 455/466 |
| 6,081,514 A | 6/2000 | Raith ............................... 370/321 |
| 6,081,546 A | 6/2000 | Williamson et al. ............. 375/33 |
| 6,088,431 A | 7/2000 | LaDue ............................ 379/114 |
| 6,094,578 A | 7/2000 | Purcell et al. ................... 455/426 |
| 6,097,951 A | 8/2000 | Ernam et al. .................... 455/433 |
| 6,108,537 A | 8/2000 | Comer et al. ................... 455/426 |
| 6,108,540 A | 8/2000 | Sonti et al. ...................... 455/433 |
| 6,111,539 A | 8/2000 | Mannings et al. ........ 342/357.09 |
| 6,122,514 A | 9/2000 | Spaur et al. ..................... 455/448 |
| 6,125,275 A | 9/2000 | Comer et al. ................... 455/426 |
| 6,138,034 A | 10/2000 | Willey ............................. 455/522 |
| 6,144,722 A | 11/2000 | Anderson et al. ................ 379/27 |
| 6,144,859 A | 11/2000 | LaDue ............................ 455/511 |
| 6,148,202 A | 11/2000 | Wortham ........................ 455/434 |
| 6,150,955 A | 11/2000 | Tracy et al. ................ 340/870.02 |
| 6,151,507 A | 11/2000 | Laiho et al. ..................... 455/466 |
| 6,154,648 A | 11/2000 | Comer ............................ 455/426 |
| 6,154,658 A | 11/2000 | Caci ................................ 455/466 |
| 6,161,020 A | 12/2000 | Kim ................................ 455/466 |
| 6,163,701 A | 12/2000 | Saleh et al. ...................... 455/456 |
| 6,169,895 B1 | 1/2001 | Buhrmann et al. ............. 455/423 |
| 6,175,732 B1 | 1/2001 | McDaniel et al. .............. 455/433 |
| 6,181,981 B1 | 1/2001 | Varga et al. |
| 6,185,198 B1 | 2/2001 | LaDue ............................ 370/329 |
| 6,195,546 B1 | 2/2001 | Leung et al. .................... 455/419 |
| 6,215,404 B1 | 4/2001 | Morales .......................... 340/577 |
| 6,233,450 B1 | 5/2001 | Seppanen ........................ 455/426 |
| 6,236,357 B1 | 5/2001 | Corwith .................... 342/357.08 |
| 6,249,217 B1 | 6/2001 | Forbes ............................ 340/426 |
| 6,259,781 B1 | 7/2001 | Crouch et al. .................. 379/207 |
| 6,263,212 B1 | 7/2001 | Ross et al. ....................... 455/466 |
| 6,282,496 B1 | 8/2001 | Chowdhary ..................... 701/220 |
| 6,285,868 B1 | 9/2001 | LaDue ............................ 455/410 |
| 6,285,953 B1 | 9/2001 | Harrison et al. ................ 701/213 |
| 6,292,669 B1 | 9/2001 | Meuronen et al. .............. 455/466 |
| 6,297,768 B1 | 10/2001 | Allen, Jr. ..................... 342/357.1 |
| 6,298,232 B1 | 10/2001 | Marin et al. ..................... 455/413 |
| 6,311,056 B1 | 10/2001 | Sandidge ......................... 455/414 |
| 6,311,060 B1 | 10/2001 | Evans et al. ..................... 455/426 |
| 6,330,452 B1 | 12/2001 | Fattouche et al. ............... 455/456 |
| 6,339,731 B1 | 1/2002 | Morris et al. |
| 6,353,743 B1 | 3/2002 | Karmel ........................... 455/456 |
| 6,353,745 B1 | 3/2002 | Wehrend et al. ................ 455/466 |
| 6,363,249 B1 | 3/2002 | Nordeman et al. ............. 455/418 |
| 6,363,254 B1 | 3/2002 | Jones et al. ..................... 455/456 |
| 6,363,324 B1 | 3/2002 | Hildebrant ...................... 701/213 |
| 6,366,791 B1 | 4/2002 | Lin et al. |
| 6,369,719 B1 | 4/2002 | Tracy et al. ................ 340/870.02 |
| 6,370,135 B1 | 4/2002 | Gardner .......................... 370/352 |
| 6,377,210 B1 | 4/2002 | Moore ........................ 342/357.13 |
| 6,389,289 B1 | 5/2002 | Voce et al. ...................... 455/456 |
| 6,393,295 B1 | 5/2002 | Butler et al. .................... 455/458 |
| 6,397,056 B1 | 5/2002 | Bugnon et al. ................. 455/411 |
| 6,405,033 B1 | 6/2002 | Kennedy, III et al. ......... 455/414 |
| 6,424,828 B1 | 7/2002 | Collins et al. ................... 455/412 |
| 6,424,841 B1 | 7/2002 | Gustafsson ..................... 455/466 |
| 6,457,038 B1 | 9/2002 | Defosse .......................... 709/200 |
| 6,476,763 B2 | 11/2002 | Allen, Jr. ....................... 342/357.1 |
| 6,484,035 B2 | 11/2002 | Allen, Jr. ......................... 455/456 |
| 6,487,602 B1 | 11/2002 | Thakker .......................... 709/230 |
| 6,493,556 B1 | 12/2002 | Stinson ........................... 455/445 |
| 6,493,558 B1 | 12/2002 | Bernhart et al. ................ 455/466 |
| 6,515,997 B1 | 2/2003 | Feltner et al. ................... 370/401 |
| 6,516,197 B2 | 2/2003 | Havinas et al. |
| 6,553,336 B1 | 4/2003 | Johnson et al. |
| 6,560,456 B1 | 5/2003 | Lohtia et al. .................... 455/445 |
| 6,567,501 B1 | 5/2003 | Pernu et al. |
| 6,570,532 B2 | 5/2003 | Mise et al. .................. 342/357.1 |
| 6,608,553 B2 | 8/2003 | Isobe |
| 6,618,671 B2 | 9/2003 | Dooley et al. .................. 701/213 |
| 6,622,016 B1 | 9/2003 | Sladek et al. ................... 455/414 |
| 6,625,461 B1 | 9/2003 | Bertacchi ........................ 455/466 |
| 6,643,511 B1 | 11/2003 | Rune et al. |
| 6,665,532 B1 | 12/2003 | Boland et al. |
| 6,683,881 B1 | 1/2004 | Mijares et al. |
| 6,710,738 B2 | 3/2004 | Allen, Jr. ....................... 342/357.1 |
| 6,714,793 B1 | 3/2004 | Carey et al. ..................... 455/466 |
| 6,718,177 B1 | 4/2004 | Comer et al. ................... 455/458 |
| 6,718,237 B1 | 4/2004 | Murray et al. ..................... 701/24 |
| 6,738,647 B1 | 5/2004 | Link, II .......................... 455/564 |
| 6,741,853 B1 | 5/2004 | Jiang et al. ...................... 455/418 |
| 6,741,863 B1 | 5/2004 | Chiang et al. |
| 6,745,041 B2 | 6/2004 | Allison et al. .................. 455/466 |
| 6,760,580 B2 | 7/2004 | Robinson et al. ........... 455/412.2 |
| 6,771,949 B1 | 8/2004 | Corliss ............................ 455/413 |
| 6,782,276 B1 | 8/2004 | Lam et al. ....................... 455/560 |
| 6,826,397 B1 | 11/2004 | Vasa |
| 6,828,909 B2 * | 12/2004 | Script et al. .................. 340/545.1 |
| 6,856,808 B1 | 2/2005 | Comer et al. ................... 455/466 |
| 6,861,947 B2 | 3/2005 | Albert |
| 6,865,191 B1 | 3/2005 | Bengtsson et al. ............. 370/475 |
| 6,882,843 B1 | 4/2005 | Comer ............................ 455/445 |
| 6,959,192 B1 | 10/2005 | Cannon et al. |
| 6,980,887 B2 | 12/2005 | Varga et al. |
| 6,982,656 B1 | 1/2006 | Coppinger et al. |
| 7,005,997 B1 | 2/2006 | Wiewiura |
| 7,010,306 B1 | 3/2006 | Tanibayashi et al. |
| 7,542,721 B1 * | 6/2009 | Bonner et al. .................. 455/41.2 |
| 2001/0003093 A1 | 6/2001 | Lundin ............................ 455/456 |
| 2001/0042121 A1 | 11/2001 | Defosse et al. ................. 709/224 |
| 2001/0047244 A1 | 11/2001 | Harrison et al. ................ 701/213 |
| 2001/0047410 A1 | 11/2001 | Defosse .......................... 709/224 |
| 2001/0054083 A1 | 12/2001 | Defosse .......................... 709/217 |
| 2002/0016829 A1 | 2/2002 | Defosse .......................... 709/217 |
| 2002/0073333 A1 * | 6/2002 | Palka et al. ..................... 713/201 |
| 2002/0077077 A1 * | 6/2002 | Rezvani et al. ................. 455/410 |
| 2002/0086636 A1 | 7/2002 | Tracy et al. .................... 455/3.01 |
| 2002/0110230 A1 | 8/2002 | Leuca et al. ................ 379/201.01 |
| 2002/0120728 A1 | 8/2002 | Braatz et al. |
| 2002/0142759 A1 | 10/2002 | Newell et al. |
| 2002/0153410 A1 * | 10/2002 | Santini ............................ 235/375 |
| 2002/0155844 A1 | 10/2002 | Rankin et al. .................. 455/456 |
| 2002/0160771 A1 | 10/2002 | Massie et al. ................... 455/426 |
| 2002/0164988 A1 | 11/2002 | Vishwanathan et al. ....... 455/445 |
| 2002/0177428 A1 * | 11/2002 | Menard et al. .................. 455/404 |

| | | | | | | |
|---|---|---|---|---|---|---|
| 2002/0194387 A1 | 12/2002 | Defosse | 709/251 | WO | WO 95/25407 A1 | 9/1995 |
| 2002/0196924 A1 | 12/2002 | Dahari | 379/220.01 | WO | WO 95/26088 A1 | 9/1995 |
| 2003/0003930 A1 | 1/2003 | Allison et al. | 455/466 | WO | WO 96/03007 A1 | 2/1996 |
| 2003/0009313 A1 | 1/2003 | May et al. | 702/188 | WO | WO 96/10895 A1 | 4/1996 |
| 2003/0021273 A1 | 1/2003 | Fouquet et al. | 370/392 | WO | WO 96/37079 A1 | 11/1996 |
| 2003/0022656 A1 | 1/2003 | Hinnant, Jr. et al. | 455/410 | WO | WO 96/38989 A1 | 12/1996 |
| 2003/0054830 A1 | 3/2003 | Williams et al. | 455/456 | WO | WO 97/36435 A1 | 10/1997 |
| 2003/0097474 A1 | 5/2003 | Defosse et al. | 709/246 | WO | WO 97/38540 A1 | 10/1997 |
| 2003/0101257 A1 | 5/2003 | Godwin | 709/223 | WO | WO 97/45991 A2 | 12/1997 |
| 2003/0101262 A1 | 5/2003 | Godwin | 709/224 | WO | WO 98/06227 A2 | 2/1998 |
| 2003/0119489 A1 | 6/2003 | Mohammed | | WO | WO 98/19438 A1 | 5/1998 |
| 2003/0119498 A1 | 6/2003 | Haas et al. | 455/426 | WO | WO 98/19447 A1 | 5/1998 |
| 2003/0129969 A1 | 7/2003 | Rucinski | 455/412 | WO | WO 98/27780 A2 | 6/1998 |
| 2003/0141990 A1 | 7/2003 | Coon | | WO | WO 99/26428 A1 | 5/1999 |
| 2003/0158650 A1 | 8/2003 | Abe et al. | | WO | WO 99/60769 A1 | 11/1999 |
| 2003/0182053 A1 | 9/2003 | Swope et al. | | WO | WO 00/03532 A2 | 1/2000 |
| 2003/0204391 A1 | 10/2003 | May et al. | 704/8 | WO | WO 00/17021 A1 | 3/2000 |
| 2004/0029598 A1 | 2/2004 | Guggisberg | 455/466 | WO | WO 00/28347 A1 | 5/2000 |
| 2004/0083173 A1* | 4/2004 | Reddihough et al. | 705/41 | WO | WO 00/36812 A1 | 6/2000 |
| 2004/0110493 A1 | 6/2004 | Alvarez et al. | 455/414.1 | WO | WO 01/63825 A2 | 8/2001 |
| 2004/0142707 A1 | 7/2004 | Midkiff et al. | 455/466 | WO | WO 01/63960 A1 | 8/2001 |
| 2004/0180678 A1 | 9/2004 | Smith et al. | 455/466 | WO | WO 01/72068 A1 | 9/2001 |
| 2004/0186739 A1* | 9/2004 | Bolles et al. | 705/1 | WO | WO 01/80583 A2 | 10/2001 |
| 2004/0203640 A1 | 10/2004 | Molander et al. | 455/414.1 | WO | WO 02/35866 A2 | 5/2002 |
| 2005/0037784 A1 | 2/2005 | Cleary | 455/466 | WO | WO 02/089085 A1 | 11/2002 |
| 2005/0102074 A1 | 5/2005 | Kolls | | WO | WO 03/019925 A2 | 3/2003 |
| 2005/0181771 A1* | 8/2005 | Cuddihy et al. | 455/414.1 | WO | WO 2005/074430 A2 | 8/2005 |
| 2005/0197106 A1 | 9/2005 | Bristow et al. | | WO | WO 2006/014419 A1 | 2/2006 |
| 2005/0200474 A1* | 9/2005 | Behnke | 340/521 | | | |
| 2005/0213715 A1* | 9/2005 | Winick | 379/39 | | | |
| 2006/0039389 A1* | 2/2006 | Burger et al. | 370/401 | | | |
| 2006/0077053 A1* | 4/2006 | Park et al. | 340/521 | | | |
| 2006/0181411 A1* | 8/2006 | Fast et al. | 340/539.13 | | | |
| 2007/0057804 A1* | 3/2007 | Appleyard et al. | 340/689 | | | |
| 2007/0247302 A1* | 10/2007 | Martin | 340/506 | | | |
| 2007/0286181 A1* | 12/2007 | Bushmitch et al. | 370/356 | | | |
| 2008/0025487 A1* | 1/2008 | Johan et al. | 379/106.01 | | | |
| 2010/0049849 A1* | 2/2010 | Hershkovitz et al. | 709/224 | | | |
| 2010/0271198 A1* | 10/2010 | Boling et al. | 340/539.1 | | | |
| 2011/0001812 A1* | 1/2011 | Kang et al. | 348/77 | | | |
| 2011/0095883 A1* | 4/2011 | Watts et al. | 340/539.11 | | | |

FOREIGN PATENT DOCUMENTS

| | | |
|---|---|---|
| EP | 0 123 562 B1 | 7/1990 |
| EP | 0 345 818 B1 | 12/1996 |
| EP | 0 837 341 A1 | 4/1998 |
| EP | 0 855 824 A2 | 7/1998 |
| EP | 0 924 918 A2 | 6/1999 |
| EP | 0 959 600 A1 | 11/1999 |
| GB | 2 363 289 A | 12/2001 |
| JP | 4-96509 | 3/1992 |
| WO | WO 92/14329 A1 | 8/1992 |
| WO | WO 94/05095 A1 | 3/1994 |
| WO | WO 95/24791 A1 | 9/1995 |

OTHER PUBLICATIONS

European Telecommunication Standards Institute; *European Digital Cellular Telecommunications System (Phase 2); Technical Realization of the Short Message Service (SMS) Point to Point (PP) (GSM 03.40)*; European Telecommunication Standard; Oct. 1993; Draft pr ETS 300 536; pp. 1-103.

European Telecommunication Standards Institute; *European Digital Cellular Telecommunications System (Phase 2); Technical Realization of Short Message Service Call Broadcast (SMSCB) (GSM 03.41)*; European Telecommunication Standard; Oct. 1993; Draft pr ETS 300 537; pp. 1-24.

funSMS.net; *SMS Tutorial*; pp. 1-17; http://www.funsms.net/sms_tutorial.htm.

Isochron Data Corporation; *Connect With Your Vending Machines—and Watch Your Profits Soar*; www.isochron.com/solutions_VC.htm; (2002); pp. 1-2.

Lee, William C. Y.; *Mobile Cellular Telecommunications Systems*; ISBN 0-07-037030-3; 1989; pp. 74-80.

Mouly et al.; *The GSM System for Mobile Communications*; ISBN: 2-9507190-0-7; © 1992; pp. 56-59.

TIA/EIA IS-41.5-C Standard; pp. 24, 65, 206, 207.

\* cited by examiner

SERVICE ESCROWED TRANSPORTABLE WIRELESS EVENT REPORTING SYSTEM

PRIORITY APPLICATION

The present invention claims priority to U.S. Provisional Patent Application No. 60/899,780, filed on Feb. 6, 2007, which is hereby fully incorporated herein by reference.

FIELD OF THE INVENTION

The present invention generally relates to a wireless event reporting system for home, office, or a temporary location that is suitable for mass-market distribution and configured for transport to different installation sites.

BACKGROUND OF THE INVENTION

Conventional event reporting systems are typically permanently fixed to a location, installed by a service company, and monitored over telephone or data communications services. These systems may have sensors or detectors permanently installed to detect reportable events, such as intrusion or environmental conditions, which preclude the system from being easily removed and used at another location. Further, conventional event reporting systems are typically limited to reporting reportable events to a service company (i.e., a monitoring agency) using fixed communications services, such as landline telephone service, Internet, or derived data channels. Therefore, as is usually the case, the consumer of the event reporting system may only receive a notice of reportable events if someone at the monitoring service company acts to contact the consumer. Accordingly, in conventional reporting and monitoring systems, the consumer does not have the option of having the reportable events reported directly to them by the event reporting system.

Further, because conventional event reporting systems are typically installed and monitored by a service company, consumers typically must agree to a service contract or otherwise communicate with the monitoring service company prior to the installation of the event reporting systems. For example, it is not uncommon for a consumer to schedule an "installation" time with the service company and/or make advance payment for monitoring services. Thus, with conventional event reporting systems, the consumer is required at some point of time to disclose his or her identity to the service company.

Additionally, as noted, conventional event reporting systems are installed by a service company, typically by using service technicians. This adds additional cost to the event reporting system and, once permanently installed, keeps the event reporting system from being easily moved to another location by the consumer. Because of this, the consumer may be reluctant to use a conventional event reporting system. For example, installation costs and other costs of the event reporting system may be cost prohibitive for some consumers. Additionally, if a consumer would like to monitor the security or environment of a space temporarily, they may not want to expend time or money on a permanent alarm system. In these instances, conventional event monitoring systems do not provide a viable option to meet consumers' demands. Accordingly, there currently exists a need in the art for a widely-available, service escrowed portable monitoring system that a consumer may conveniently purchase and install anywhere he or she chooses.

SUMMARY OF THE INVENTION

The portable monitoring system described herein may be sold and purchased through widely-available, mass-market channels. For example, the system may be sold in a blister-pack-type package at a retail outlet for purchase by consumers. The consumer may install the system in any location, including, but not limited to, a home, office, vehicle, or motel room. Unlike conventional systems, no communication between the consumer and the provider of the event monitoring service are required to use the system. Further, since the device may be purchased with escrowed service, no billing arrangements or contracts with a service provider are necessary.

After selecting the portable system, the consumer may proceed to setup the event reporting system in any location. The event reporting system may comprise a microprocessor based controller (hereafter referred to as "controller") with short range wireless communications capability for communicating with wireless sensors and long range wireless communications capability, such as audio and data over cellular telephony. The event reporting system also comprises one or more event detectors for monitoring security intrusions or other environmental events (e.g., fire, carbon monoxide, etc). The event detectors can communicate detected reportable events via short range wireless capabilities or wired communication paths. Events that may be detected by a detector may be referred to hereinafter broadly as "reportable events." The event reporting system may also comprise one or more human interfaces, such as an LCD screen or speaker for conveying information to the consumer, primarily during installation, and a keypad or microphone for conveying information from the consumer to the controller. Additionally, the event reporting system may comprise a human interface for conveying information to or from the consumer via a telecommunication path by tomes, email, data packets, or speech recognition and synthesis.

Once the event reporting system has been set up, the consumer may initialize and event monitoring service through the controller. For example, upon powering up, the controller may contact a remote monitoring station or other third-party host server over a wireless network. The controller may convey its identity to the remote monitoring station so that the escrowed service pre-associated with that identity may be activated for time, data volume, or both. The remote monitoring station may request information from the consumer, including, but not limited to, an identification for processing remote commands received from the consumer (e.g., a code that may be found with the packaging for the system or created by the system) and information for directly reporting reportable events to the consumer (e.g., a mobile device number). Also, the remote monitoring station may request information from the consumer to identify how the consumer desires to receive reportable event information, for example, a telephone number to be called for synthesized voice reporting or an email address for reporting event information as text.

After initialization, the event reporting system may detect, through the use of the sensors and detectors, the occurrence of any reportable event. If an event is detected, the event reporting system may contact the consumer directly or forward information to the remote monitoring station. If the consumer is contacted directly by the event reporting system, the message may be sent to the consumer via a wireless network in the form of a Short Message Service ("SMS") or data connection over commercially available wireless communication service's data channels, including but not limited, to General Packet Radio Service ("GPRS"), 1XRTT, 1XEV-DO, 1XMC, 3XMC or WCDMA. Further, if an event is reported to the remote monitoring station, it may subsequently be forwarded

DETAILED DESCRIPTION OF EXEMPLARY EMBODIMENTS

Figure 1:
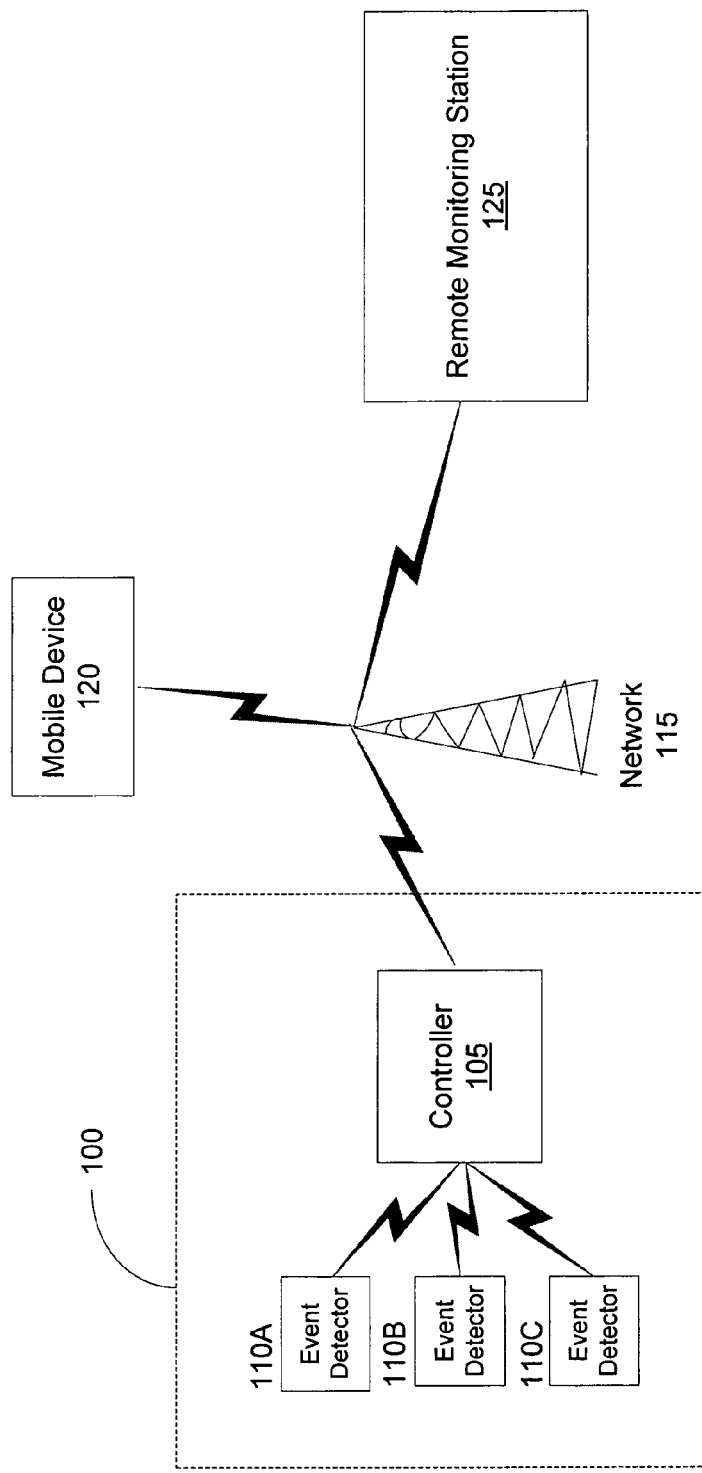
FIG. 1 illustrates a functional block diagram of an operating environment for a portable event reporting system, according to an exemplary embodiment of the present invention.

The inventive system comprises a transportable, wireless system that may be used at any location chosen by a consumer, including, but not limited to, a consumer's home, office, or temporary location. An exemplary embodiment of the present invention is designed for commercial distribution and may be sold through mass-market sales channels in appropriate packaging, such as in a blister-pack where the system can be seen by prospective consumers. Mass market sales channels may include, but are not limited to, supermarkets, convenience stores, and superstores.

The system, in one exemplary embodiment, may comprise a disposable controller. Further, the system may provide escrow event reporting (i.e., pre-paid event reporting services). One advantage of the escrowed event reporting system over conventional systems is that it does not require communications with a service provider prior to purchase; that is, the consumer may purchase the portable event reporting system without communicating with the provider to set up a billing identity or provide other identifying information. Furthermore, because the system is capable of being compact in size, wireless, and easy to install, a consumer may move the system to different locations, unlike the permanent setup associated with conventional systems.

As noted above, the portable event reporting system does not require that a billing identity be established for the consumer. According to an exemplary embodiment, the transportable service escrowed event reporting system connects to a remote server, such as a remote monitoring station, when the product is powered on for the first time. By doing so, the remote monitoring station determines and activates the escrowed service for the system. Additionally, the escrowed service may be activated by the consumer entering a device identity, such as the International Mobile Equipment Identity (IMEI), a number unique to every GSM and UMTS wireless telephone, or Electronic Serial Number or MEID of CDMA and other wireless networks, by using a keypad and/or liquid crystal display ("LCD") located on a controller of the system, or via speech recognition and voice synthesis using a microphone and speaker in the controller. Alternatively or additionally, the consumer may convey the system identity to activate the escrowed service by placing a telephone call to a remote host server capable of interacting through voice prompts or DTMF tones. For example, in one exemplary embodiment, the consumer may be provided the option of calling a 1-800 number that connects to a remote monitoring station to initialize the event reporting system after it has been purchased.

Because the event reporting system is designed to be portable, in an exemplary embodiment, all communications within the monitored premises, as well as the remote delivery of alarms, can be performed via wireless communications. For instance, in an exemplary embodiment, the controller may receive notice of reportable events through short range wireless event detectors, including, but not limited to, door/window opening detectors, glass breakage detectors, motion detectors, temperature detectors, and smoke detectors. These sensors and detectors may be implemented using industry-standard, short-range, wireless sensors. Wireless sensors typically communicate over a radio-frequency spectrum, such as those utilized by IEEE standards 802.14.4, 802.11 or 802.15.1, and do not utilize cellular telecommunications services; however, the controller and detectors may use any wired or wireless protocol to communicate, including any other short-range wireless communications known to one of ordinary skill in the art.

Upon the detection of a reportable event, the event reporting system may report the event either "direct" to the consumer or through an intermediary, such as a remote monitoring station. In an exemplary embodiment, direct alarm reporting can be implemented by a direct communication path to the consumer using a "controller to consumer" approach. For example, a reportable event can be communicated directly to the consumer through any one of several mediums including, but not limited to, email conveyed from the controller by via wireless telephone-based Short Messaging Service (SMS) or data connection protocols, such as email, and over commercially available wireless communication service's data channels, including but not limited to 1XRTT, 1XEV-DO, 1XMC, 3XMC or WCDMA or General Packet Radio Services (GPRS). Such messages are typically presented to the consumer on their cellular telephone screen, pager, personal digital assistant ("PDA"), or personal computer. Alternatively, direct alarm reporting can be achieved in the form of speech, where alarm information is converted into audio synthesized speech and conveyed from the controller to a consumer's predefined telephone number in the form of spoken words.

As mentioned above, alarm reporting may also be accomplished through an intermediary using the event monitoring system. In an exemplary embodiment, this intermediary may be the remote monitoring station, and the controller of the event reporting system may contact the remote monitoring station using alarm-industry, standard tone sequences within the audio channel of wireless telephony, or via data representations of either alarm industry data formats or proprietary protocols conveyed by the SMS or data channels of wireless telephony, such as described above.

The transportable service escrowed event reporting system may be configured when it is first turned on or subsequent thereto. Configuration of the system may be accomplished via an LCD screen and/or keypad located on the controller. Alternatively or additionally, configuration may occur by the consumer dialing a 1-800 number to provide information to the remote monitoring station, which may in turn provide pertinent information (e.g., a telephone number for reporting reportable events) to the controller through a network (as discussed below). Additionally, system reconfiguration may be accomplished via data messages conveyed from the consumer's wireless telephone in the form of SMS or other data messages, which may be carried by the data channels of the serving cellular system. Also, reconfiguration may be accomplished by calling a 1-800 number to access the remote monitoring station.

When configuration is accomplished remotely, it may be important to authenticate the consumer. Accordingly, in one exemplary embodiment, authentication of the consumer's identity can be accomplished by the system's recognition of the consumer's calling line ID (CLID), which may be previously registered through functions of the configuration LCD screen and keypad located on the controller or provided to the remote monitoring station. Thus, in order to authenticate the consumer, the consumer may be required when configuring the system to enter an identification that can be used to authenticate his or her identity or mobile device. This identification may comprise an identity for the event reporting system or another unique identification, such as a personal identification number ("PIN") selected by the consumer.

Alternatively or additionally, system configuration and/or reconfiguration can be accomplished via data messages conveyed in the audio channel of the consumer's wireless telephone via DTMF tone sequences from the consumer's telephone. Similarly, system configuration/reconfiguration may be accomplished via speech recognition of words spoken by the consumer and conveyed from the consumer's cellular telephone over the voice channel of a telephone service. For example, a consumer may connect to the controller through a wireless network and speak a pass-code previously registered with the system in order to re-configure the system.

Turning to the several figures, in which like reference numerals represent like elements, FIG. 1 illustrates a representative operating environment of the transportable service escrowed event reporting system 100, according to an exemplary embodiment. As illustrated, the transportable service escrowed event reporting system 100 may comprise a microprocessor enabled controller 105 (which may or may not be disposable) and one or more event detectors 110a-c. The event detectors 110a-c may comprise any industry-standard, short-range wireless security or environmental sensors, such as, but not limited to, door/window opening detectors, glass breakage detectors, and motion detectors. According to an exemplary embodiment, the controller 105 and detectors 110a-c may be sold in any packaging suitable for mass-market distribution. One such packaging may be blister-type packaging, which may comprise a plastic packaging material surrounding the portable event reporting system 100. When packaged this way, the system 100 can be sold through mass-market sales channels, including, but not limited to, supermarkets, superstore, or via the Internet. This wide-spread availability of the portable event reporting system 100 is possible because, unlike conventional systems, service and billing information for the portable event reporting system 100 is not required prior to a consumer purchasing and installing the system 100 in his or her home or office (if at all).

As further illustrated in FIG. 1, the portable event reporting system 100 may connect to a remote monitoring station 125 over a network 115. In an exemplary embodiment, the network 115 may comprise any wireless data network, whereby messages may be exchanged using SMS and/or connection based protocols using commercially available wireless data connection capability such as that offered by GPRS or 1XRTF and their derivatives. The remote monitoring station 125 may comprise a third-party, who may or may not manufacture and provide the portable event reporting system 100 to the consumer.

In an exemplary embodiment, the portable event reporting system 100 contacts the remote monitoring station 125 automatically over the network 115 when it is powered on for the first time by the consumer. This may be done through a transceiver connected to or incorporated within the controller 105, and may allow alarm device 105 to establish an operational identity (if not pre-assigned to the device, as discussed below), such as an EMSI, Electronic Serial Number, or MEID, and also allows the consumer the opportunity to configure the portable event reporting system 100 and enter notification preferences for use with the system 100.

Connection through the network 115 may occur by using an identity pre-assigned to the controller 105. For example, an identity for a wireless provider may be assigned to the controller 105 during its manufacture. In this way, the controller 105 may automatically connect to the network 115 when it is first powered on by the consumer. Alternatively, however, the controller 105 may be provided an identity after it is powered on. In this exemplary embodiment, the consumer may call a number found on the product packaging for the controller 105 or system 100 to connect to a remote monitoring station (e.g., dialing a 1-800 number). The remote monitoring station 125 may then request that the consumer enter a unique identification for the device, such as the device's IMEI number, if GSM, or Electronic Serial Number or MEID if CDMA or other wireless technology, for initializing the controller 105.

After the identification has been entered, the remote monitoring station 125 may send a message to the controller via SMS or connection based wireless data communication 105 over the network 115, in which case the controller 105 may respond with information in order to establish the operational identity for the controller 105.

Further still, the controller 105 may be assigned a generic identity (i.e., an identity used for a group of controllers sold through mass-market sales channels) for use at its initial power up. In this exemplary embodiment, the controller may establish an operational identity by contacting the remote monitoring station 125 upon power-up using the generic identity. Following this contact, the remote monitoring station 125 may assign a different, unique operational identity to the controller 105 for any future communication between the controller 105 and the remote monitoring station 125.

Once the operational identity for the controller 105 has been determined, the system 100 may provide a wireless device unique identity number, such as the IMEI of a GSM device, or Electronic Serial Number or MEID if CDMA or other wireless technology, automatically to the remote monitoring station 125 to ensure the device is identified properly. Alternatively, as discussed above, the consumer may provide this information to the remote monitoring station 125 via a 1-800 number.

Further, the remote monitoring station 125 may prompt the consumer for information. This prompt may be sent over the network to the controller 105 or the prompt may be performed through the use of a 1-800 number the consumer uses to configure the system 100. In either case, the remote monitoring station 125 may request contact information specifying where reportable events should be reported. For example, the remote monitoring station 125 may request the consumer to "specify a number to call when a fire is detected" or "specify a number to call when a burglary is detected." In one exemplary embodiment, the controller 105 may comprise a LCD screen and keypad that allows the consumer to configure and enter information into the portable event reporting system 100. Thus, using these components, the consumer may enter an identification that will allow him or her to communicate with the controller 105 remotely. This identification may comprise a pass-code, a mobile number through which calling line ID ("CLID") can be checked, or another unique identifier. This pass-code may allow the consumer to validate himself or herself when remotely connecting to the system 100. For example, if a consumer wishes to re-configure the system 100, he or she may call the system 100 with a mobile device. The system 100 may have stored the number for the mobile device previously entered into the system 100 using the controller 105 keypad. In this way, the system 100 will recognize the CLID number for the mobile device and allow the consumer to change the configuration of the system 100 via data messages conveyed from the consumer's cellular telephone, such as through SMS messages or email via wireless channelized data communications such as GPRS or 1XRTT and their derivatives. Alternatively or additionally, when the consumer calls the portable system, he or she may speak or enter the pass-code or other identification information previously stored to use the system 100. This pass code may also comprise the identity of the one or more mobile devices that the consumer may authorize to re-configure the system 100.

In an exemplary embodiment, the transportable service escrowed event reporting system 100 may communicate with a consumer mobile device 120 over the network 115. Thus, when the consumer initializes the reporting service, the consumer may also be prompted by the controller 105 to enter a mobile number to contact the consumer when directly reporting reportable events. This way, when the system 100 is in a direct report mode, if the controller 105 receives a signal from one of the detectors 110 attached to it, it may automatically send a message to the consumer mobile device 120 over the network 115 using the number provided by the consumer.

Figure 2:
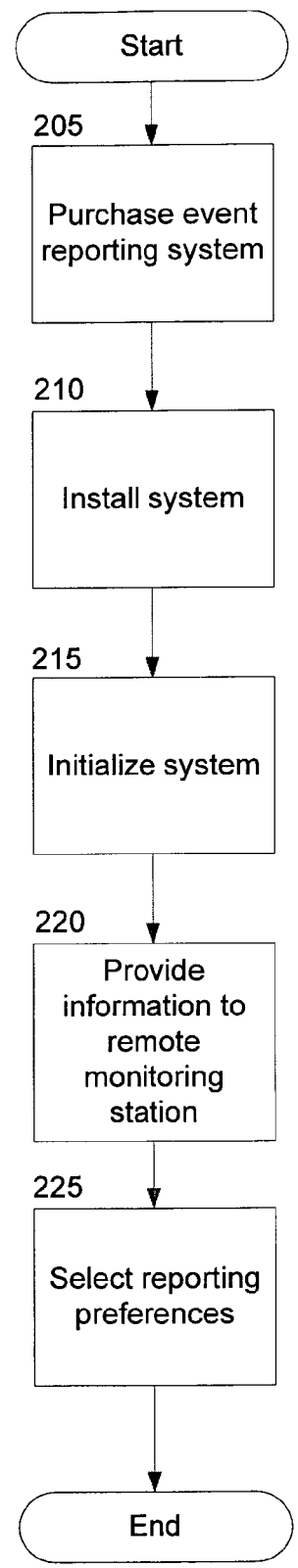
FIG. 2 illustrates a logic flow diagram for using the portable event reporting system, according to an exemplary embodiment of the present invention.

Turning to FIG. 2, because the portable event reporting system 100 may be sold and marketed through mass-market channels, a consumer may simply visit a store and purchase a "kit" comprising the portable event reporting system 100, take the kit to the desired location, install it, and initialize the system. FIG. 2 illustrates an exemplary method for setting up the transportable service escrowed event reporting system 100. The process begins at step 205, where a consumer visits a store and purchases the transportable service escrowed event reporting system 100. For example, the consumer can buy the system 100 at a retail outlet, where the system may be packaged in a blister pack that houses all items required to support the consumer's alarm service. Further, according to an exemplary embodiment, the consumer may purchase the system 100 pre-packaged with communication services (i.e., pre-paid time or usage over a wireless network) that will support the controller's 105 initial set-up and basic operations. Further, new services may be acquired at a later date based on new purchases. For example, according to an exemplary embodiment, a tiered service level offering can be provided to the consumer. Basic service may cover set-up and a pre-set number of alarm event communications; advanced service may cover maintenance (in the form of a periodic testing of the radio messaging system by the remote monitoring station 125) and a pre-set number of alarm event communications; and premium service may cover regular tests of the radio messaging system (e.g., daily or every pre-set number of days) in combination with a pre-set number of alarm event communications. Each of these services would be sold with their own escrowed service (i.e., prepaid event reporting) and would require activation in a manner similar to that of the basic system in order to enable such advanced features.

As mentioned above, the portable event reporting system 100 may comprise a radio transceiver or transmitter (not illustrated) for communicating with the network 115. This radio transceiver or transmitter may be integrated within the controller or, in alternative embodiments, may be physically separate from, but connected to, the controller. For example, in one exemplary embodiment, the controller 105 may not have a transceiver, but instead may be tethered or ported with a consumer's mobile device to communicate over the network 115. In either embodiment, a transceiver may—upon system power-up by a consumer—initiate an automated configuration process with the server or remote monitoring station 125 to identify the system 100 and/or controller 105. Specifically, as discussed, the radio transceiver may forward its pre-assigned operational identity to the remote monitoring station 125 over the network 115 or it may receive an operational identity in response to a message sent by the remote monitoring station 125. For example, as mentioned, the remote monitoring station 125 may forward an operational identity to the controller 105 based on the consumer's interaction with a 1-800 telephone service related to the remote monitoring station 125. Further, the consumer may be allowed to reconfigure the radio and the alarm service through subsequent interactions with a 1-800 telephone service related to the remote monitoring station 125.

The system 100 may come pre-packaged with a certain number of event detectors 110. At step 210, the consumer installs the detectors 110 in appropriate places. As discussed, the detectors may comprise standard wireless detectors as known by one of ordinary skill in the art.

After the detectors are installed, the transportable service escrowed event reporting system 100 may be initialized at step 215. In an exemplary process, this initialization occurs when the controller 105 is turned on for the first time and the portable event reporting system 100 connects to the remote monitoring station 125 through the network 115 and establishes an operational identity (as previously discussed). According to an exemplary embodiment, the system 100 may be turned on by the consumer pulling a battery tab or by pressing a power button on the controller 105. The controller then automatically goes through the process of connecting to the remote monitoring station 110 (if already supplied an identity) or awaits a message from the remote monitoring station 110 (if not already supplied an identity).

After initialization, the system 100 may inform the consumer as to the communication status of the device (e.g., through a sound or blinking light indicating that the unit has properly connected to the remote monitoring station 125). Then, if so equipped, the consumer may be prompted by an LCD display on the controller 105 to enter information to configure the event reporting system at step 220. During this step, according to an exemplary embodiment, the event reporting system 100 may request that the consumer enter contact information into a keypad attached to the controller 105 in order to use the features of the system 100. Contact information may comprise, for example, a telephone number or email address for the consumer. The controller 105 may, in turn, forward the information collected from the consumer to the remote monitoring station 125. Additionally, certain information may be stored in memory connected to the controller 105. For example, a consumer may enter a preference for receiving reportable information by entering his or her telephone number. The controller may store that number locally so that it can route a message to the consumer relaying the occurrence of a reportable event over the network 115.

Alternatively or in addition to the above, the controller 105 may prompt the consumer (using an on-device display screen, voice prompt, or through packaging material) to configure the radio for reporting events by interacting with a 1-800 telephone service. In particular, the consumer may enter data via the 1-800 telephone to configure the system 100 to communicate event data to the consumer in a preferred format, such as via email to a designated email address or by phone to a mobile or landline phone number. For example, as described above, during the initial configuration of the system 100, a voice or display prompt on the controller 105 can prompt the consumer to enter the radio's serial number, which is known to be associated with a unique identifier assigned to the radio.

In addition to the above, the consumer may also be prompted to enter an identification at step 220 so that the consumer can control the controller remotely. For instance, the consumer may enter a CLID identifying his or her mobile device so that messages from that mobile device number can be used to control the portable event reporting system 100. For instance, the system 100 can perform authentication of the consumer's identity by recognition of the CLID of the consumer's mobile telephone. However, in the alternative, the portable event reporting system 100 can perform authentication of the consumer's identity by interpreting data messages conveyed from the consumer's cellular telephone via DTMF tone sequences over the voice channel of the serving cellular system. Further, in yet another embodiment, the portable event reporting system 100 can perform authentication of the consumer's identity by speech recognition of words spoken by the consumer and conveyed by the telephone. The consumer's spoken words may, for example, constitute a pass-code ID previously registered by the consumer using the controller 105.

Another prompt can request for the consumer to enter his or her preferred contact mechanism (e.g., an e-mail address or telephone number) to be used for directly reporting the occurrence of a reportable event. Upon completion of date entry by the consumer, the controller 105 can initiate communications diagnostics and confirm the radio's ability to receive and transmit messages to a remote monitoring station 125. A prepaid data communications service can be provided at the outset of radio operations to facilitate the initial communications exchange (set-up operations) between the controller 105 and the remote monitoring station 125. In an exemplary embodiment, subsequent communications of reportable events can be supported by the consumer's purchase of additional prepaid wireless minutes or reporting credits (through the controller 105 or via a 1-800 number connecting to the remote monitoring station 125). Further, in another embodiment, the consumer may purchase the unit from a mass-market sales channel wherein the system 100 is capable of performing a finite number of communications (i.e., a certain amount of communication services used by the system 100 to report reportable events may be pre-paid when the system 100 is purchased by the consumer). It is noted that due to the service escrowed nature of the invention (i.e., it is capable of being a prepaid system), a monthly billing service relationship with the company related to the remote monitoring station 125 or provider of the portable event reporting system 100 is not required for operation of the radio or the alarm event service for a predetermined time or quantity of events. Thus, the portable event reporting system 100 offers the ability of a consumer to conveniently purchase a pre-paid event reporting system 100 that requires no information from the consumer prior to the purchase and use of the device (if at all).

The system 100 also provides the consumer the ability to select how he or she wishes to receive alerts, as illustrated at step 225. In one exemplary embodiment, the consumer may wish to receive direct reporting from the system 100. In that case, the system 100 will report the occurrence of reportable events through the wireless network 115 directly to the device specified by the consumer. Messages sent to notify the consumer of an occurrence of a reportable event may comprise any number of formats, including, but not limited to, text messages sent via SMS or connection based wireless data service such as GPRS or 1XRTT, such as e-mail sent over the wireless network. According to an exemplary embodiment, the specific format chosen for direct reporting may be specified by the consumer when configuring (or re-configuring) the system 100.

Instead of having reportable events reported directly, the consumer may alternatively choose to have the system 100 send report messages to a third-party intermediary. In an exemplary embodiment, this intermediary may comprise the remote monitoring station 125. Accordingly, if the consumer does not choose direct routing, then the system 100 will alert the remote monitoring station 125 or other third-party over the network 115 when it detects a reportable event. The remote monitoring station 125, in turn, may notify the consumer through any number of wireless formats including, but not limited to, SMS, connection based wireless data such as GPRS or 1XRTT, text-messaging, e-mail, or other medium specified by the consumer and within the capabilities of the transportable service escrowed event reporting system 100.

As discussed, the transportable service-escrowed event reporting system 100 may be sold by a company through mass-market channels without prior communications with the consumer. In an exemplary embodiment, the system 100 may come with a finite period of time that the product may be used to report reportable events. This length of time (or other finite usage of the system 100) may, optionally, be extended by the consumer purchasing additional time through the controller 105 or calling the remote monitoring station 125 via a 1-800 number. Additionally, in another exemplary embodiment, a consumer may extend the length of time the system 100 may be used to report reportable events by providing to the remote monitoring station 125 (through the controller or via a 1-800 number) information concerning one or more pre-paid usage cards, such as pre-paid cellular service cards. For example, according to one exemplary embodiment, a consumer may purchase a pre-paid cellular calling card (or pre-paid event reporting card) and enter the information for that card into the controller 105 to extend the capabilities of the system through cooperative business arrangements between the prepaid cellular service provider and the operator of the transportable service escrowed event reporting system 100. In this way, a consumer may purchase and use the event reporting system 100 without ever being required to establish a billing identity with the system 100 or the remote monitoring station 125.

Figure 3:
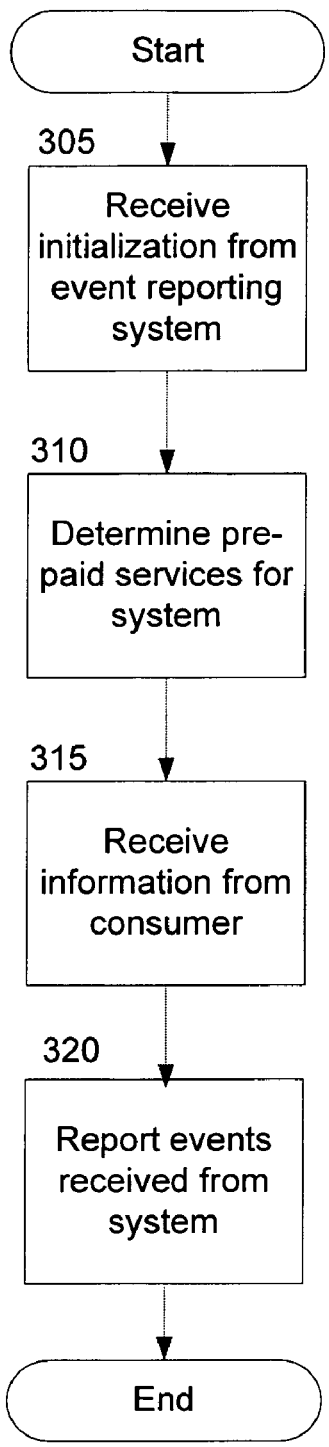
FIG. 3 illustrates a logic flow diagram for initializing and using the portable event monitoring system, according to an exemplary embodiment of the present invention.

FIG. 3 illustrates an exemplary process for initializing and using the portable event reporting system 100 through the use of a remote monitoring station 125. The process begins at step 305, where the remote monitoring station 125 receives an initialization command from the controller 105 of the event reporting system 100. In an exemplary embodiment, the remote monitoring station 125 must know the physical identity of the wireless event reporting system 100. In the GSM protocol, for example, this identity is known as the International Mobile Equipment Identity ("IMEI"), which is a unique identifier used for GSM and UMTS mobile network consumers. Thus, IMEI or another type of operational identity may be used as a unique address for the portable event reporting system for use on the network 115. The identity of the system 100 allows the remote monitoring station to detect the amount of pre-paid monitoring services the consumer is entitled to (if any) using the system. For example, certain portable systems 100 may be purchased with a finite amount of pre-paid reporting services. Therefore, when the identity of the system 100 is provided to the remote monitoring station 125, the remote monitoring station 125 may perform, at step 310, a look-up based on the identity to determine and transmit the amount of pre-paid reporting services to the system 100.

Further, once the remote monitoring station 125 receives an operational identity from the wireless event reporting system 100, in an exemplary embodiment, the remote monitoring station 125 can assign a sub-identifier to the controller 105 associated with the reporting wireless radio device (which may be a derivative of the operational identity). For example, upon initial power-up, the event reporting system 100 (through the use of a radio transmitter communicably attached to the controller 105) can transmit a message comprising the system's 100 IMEI to initiate the set-up process. This IMEI will be assigned to the portable event reporting system 100. The remote monitoring station 125 receives the IMEI and responds by assigning a telephone number to the radio associated with the IMEI. In an alternative embodiment, the remote monitoring station 125 can initiate the transmission of IMEI by the radio based on a consumer's entry of data in response to information provided by the consumer via a 1-800 telephone service.

Based on the receipt of this initialization, the remote monitoring station 125 establishes a connection with the system 100 over the network 115. Through this connection, information may be exchanged by the consumer and the remote monitoring station 125. For example, during initial configuration, the system 100 may prompt the consumer for information over the network 115. Information that may be pertinent to the event reporting system 100 includes, but is not limited to, the consumer's name and a mobile number where the consumer would like to receive messages related to reportable events. Thus, regardless of the information requested or sent to the remote monitoring station, in step 315, information may be provided to the remote monitoring station 125 directly through the system 100 (e.g., through interaction with the keypad and LCD on the controller 105). Alternatively, as discussed, a consumer may also provide information to the remote monitoring station 125 in step 315 via a telephone call to the host server of the remote monitoring station 125 or via an Internet website interaction (i.e., through the completion of a form at a website).

Once the consumer has supplied information allowing the remote monitoring station 125 to activate a service escrowed account for the consumer, the remote monitoring station 125 may then monitor for communications from the portable event reporting system 100 at step 320. In this way, the remote monitoring station 125 may act as a monitoring center for reportable events. However, unlike conventional systems, the remote monitoring station will receive messages from the portable event reporting system 100 over a wireless network 115 and may forward messages to the consumer over the wireless network 115 based on the information provided by the consumer.

Figure 4:
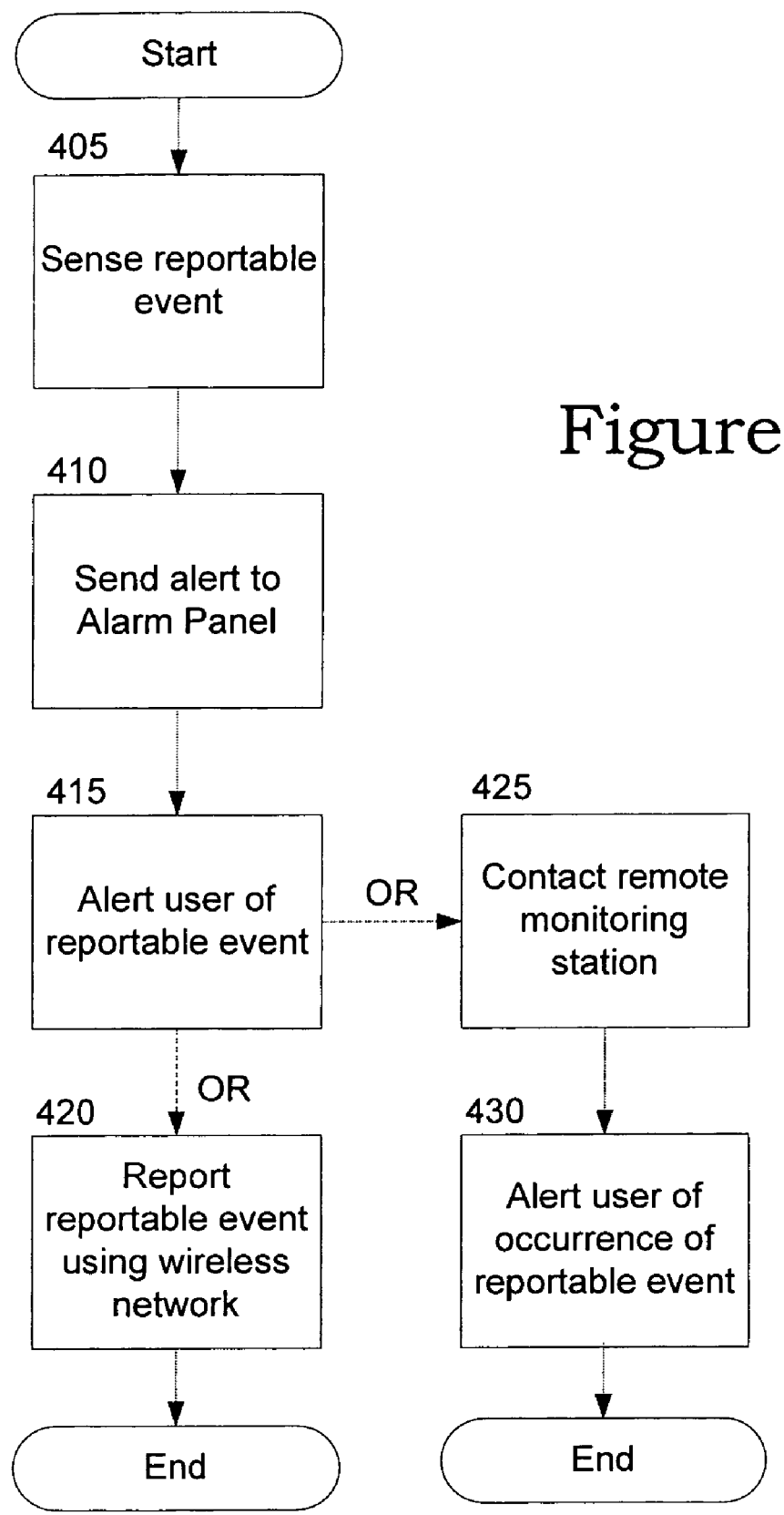
FIG. 4 illustrates a logic flow diagram for using the portable event reporting system to detect and report reportable events, according to an exemplary embodiment of the present invention.

Turning to FIG. 4, an exemplary method for using the portable event reporting system 100 to detect and report reportable events is illustrated. The process begins at step 405, where one or more of the portable detectors 110 detects a reportable event. Upon detecting the event, the detector 110 sends a message, at step 410, to the controller 105 using a standard wireless protocol, e.g., via a radio-frequency channel. When the controller 105 receives the notice of the reportable event, it may choose, at step 415, how to alert the consumer. According to an exemplary embodiment, the system 100 may report the occurrence of an event to the consumer through either direct or intermediate reporting.

If the consumer has chosen a specific type of reporting, then the controller 105 proceeds as configured by the consumer. For example, if the consumer has chosen direct reporting, then the controller 105 follows step 420, by sending a message over the network 115 to the consumer's mobile device 120. However, if the consumer has chosen intermediate reporting, then the controller forwards the notice of the reportable event, at step 425, to the remote monitoring station 125 or other third-party host server. The remote monitoring station 125 may then contact the authorities, if necessary, or send a message to the consumer at step 430. According to an exemplary embodiment, the message from the remote monitoring station 125 may comprise an SMS or wireless data connection based messages, such as GPRS or 1XRTT and their derivatives.

In view of the foregoing, it will be understood that the present invention provides a portable event reporting system 100 suitable for marketing as a transportable service escrowed device for which no recurring billing identity is initially assigned to the product (if at all). The transportable service escrowed event reporting system can accomplish its initial communications through wireless interaction with a remote host server during initial power-up. In the alternative, the portable event reporting system 100 can accomplish its initial communications identity via automatic configuration through wireless interaction with a remote host server (e.g., remote monitoring station 125) initiated by the consumer placing a telephone call to a server capable of interaction through voice prompts or DTMF tones. For example, the consumer may call a "1-800" number and establish service with the provider of the portable event reporting system 100.

In contrast to conventional monitoring systems, the portable reporting system 100 can report an alarm directly to the consumer in certain exemplary embodiments. For example, the occurrence of a reportable event may be conveyed from the event reporting system 100 to the consumer in the form of discrete SMS messages presented on the screen of the consumer's wireless device. In the alternative, alarm reporting can be conveyed from the event reporting system 100 to the consumer via cellular telephone based data connection services utilizing General Packet Radio Service (GPRS), 1XRTT, 1XEV-DO, 1XMC, 3XMC or WCDMA data channels in the form of a discrete text message presented on the screen of the consumer's wireless device. For yet another aspect of the invention, alarm reporting to the consumer can be completed via email that is conveyed wirelessly from the event reporting system via either cellular telephone based Short Messaging Service (SMS) or General Packet Radio Services (GPRS), 1XRTT, 1XEV-DO, 1XMC, 3XMC or WCDMA wireless data channels for presentation on the consumer's cellular telephone screen, pager, PDA or personal computer. Further, alarm or event reporting to the consumer can also be completed in the form of spoken words created by conversion of alarm data into audio synthesized speech that can be conveyed to a consumer preset telephone number via a voice channel telephone call.

In addition to direct reporting reportable events, the system 100 may also be configured to report the occurrence of the reportable events to an intermediary. In an exemplary embodiment, alarm or event reporting can be supported through a third-party intermediary, such as a remote monitoring station, using proprietary or alarm industry standard tone sequences within the audio channel of cellular telephony, data representations of alarm industry data formats conveyed via the SMS data channel of cellular telephony, or data representations of alarm industry data formats conveyed via the connection based wireless data channel of GPRS, 1XRTT and their derivatives of cellular telephony.

While the portable event reporting system 100 has been described as comprising a controller 105 and event detectors 110, it is noted that the system 100 may be packages and sold in many different configurations. For example, in an alternative embodiment, a cell phone may operate as part of the portable event reporting system 100. That is, a cell phone may comprise or be communicably attached to the controller 105. In one exemplary embodiment, a cell phone comprising the controller 105 may be disposable, and the consumer may purchase one or more wireless event detectors separately or with the cell phone. In this embodiment, the cell phone may have a finite service life period (i.e., may be pre-paid). The phone may have software embedded within it for detection of reportable events transmitted by wireless event detectors. Detection of these reportable events, in an exemplary embodiment, may result in a wireless transmission through designated alert mechanisms, such as through email or a call to a phone number of the consumer. According to this exemplary embodiment, a consumer may buy the disposable phone package and one or more separate event sensors that communicate with the controller comprised with the cell phone. Alternatively, however, the cell phone may not be disposable and may comprise a cell phone already owned by a consumer. In this exemplary embodiment, a consumer may buy a software package that can be downloaded (or otherwise added) to an existing phone. For example, a consumer may purchase a replacement SIM card for insertion into an existing cell phone that would thereby allow the phone to function as the controller 105 within the operating environment of the portable event reporting system 100. Further, as described previously in another exemplary embodiment, a cell phone may be tethered or otherwise attached to the controller 105 to function as a transceiver for the system 100.

Although the portable event reporting system 100 has been described in exemplary form with a certain degree of particularity, it should be understood that the present disclosure has been made only by way of example, and that numerous changes and details of construction, as well as the combination and arrangement of parts or steps, may be resorted to without departing from the spirit of scope of the invention. Accordingly, the scope of the present invention is defined by the appended claims rather than the foregoing description.

We claim the following:

1. An event reporting system, comprising:
    a portable controller comprising an operational identity that identifies a predetermined amount of prepaid event reporting services pre-associated with the event reporting system;
    a human interface coupled to the portable controller; and
    one or more short-range wireless event detectors, in communication with the portable controller, configured to generate an event report responsive to occurrence of a security event,
    wherein the portable controller is configured to:
        send, responsive to powering on the portable controller, the operational identity to a remote monitoring station over a wireless network to trigger:
            a determination of the predetermined amount of pre-associated prepaid services based on the operational identity; and
            an activation of the predetermined amount of pre-associated prepaid services; and
        prompt a consumer through the human interface for information to establish a preference for reporting reportable events.

2. The event reporting system of claim 1, wherein the portable controller is further configured to:
    contact the remote monitoring station over the wireless network automatically during initial power up;
    receive a request from the remote monitoring station to provide information that establishes the consumer's preferred mode of communication to receive event reports;
    authenticate the consumer to grant access to configure the portable controller;
    receive the event report from the event detector through a short-range wireless link established between the event detector and the portable controller; and
    store the information of the consumer locally in a memory associated with the portable controller.

3. The event reporting system of claim 1, wherein the portable controller is further configured to transmit the event report directly to a telephone number of a consumer through a wireless network based on information of the consumer stored in a memory associated with the portable controller responsive to receiving the event report from the wireless event detector.

4. The event reporting system of claim 1, wherein the event detectors communicate with the portable controller wirelessly.

5. The event reporting system of claim 4, wherein an occurrence of a reportable event is reported, by the portable controller, directly to the consumer via a message conveyed wirelessly via Short Message Service ("SMS").

6. The event reporting system of claim 4, wherein an occurrence of a reportable event is reported, by the portable controller, directly to the consumer over commercially available wireless communication data channels.

7. The event reporting system of claim 6, wherein the commercially available wireless communication data channels comprise at least one of: General Packet Radio Service ("GPRS"), 1XRTT, 1XEV-DO, 1XMC, 3XMC and WCDMA.

8. The event reporting system of claim 1, wherein the portable controller reports an occurrence of a reportable event directly to the remote monitoring station, over a wireless network between the portable controller and the remote monitoring station.

9. An event reporting system, comprising:
    a portable controller comprising a predetermined amount of prepaid event reporting services associated with the event reporting system;
    a human interface coupled to the portable controller;
    a short-range wireless event detector, communicatively coupled to the portable controller, configured to generate an event report; and
    a transceiver communicably coupled to the portable controller,
    wherein the portable controller is configured to:
        establish an operational identity for the event reporting system responsive to powering on the portable controller;
        responsive to establishing the operational identity for the event reporting system, trigger:
            determining, at the remote monitoring station, the predetermined amount of prepaid services that is pre-associated with the portable controller through a look up based on the operational identity, and
            activating, by the remote monitoring station, the predetermined amount of prepaid service that is pre-associated with the portable controller through sending the operational identity to the remote monitoring station during initial power up;
        store an information of a consumer locally in a memory associated with the portable controller;
        receive the event report from the event detector through a short-range wireless link established between the event detector and the portable controller; and
        transmit the event report directly to a telephone number of the consumer through a wireless network based on the information of the consumer stored in a memory associated with the portable controller responsive to receiving the event report.

10. The event reporting system of claim 9, wherein the portable controller is further configured to store a calling line ID ("CLID") for remotely accessing the controller.

11. The event reporting system of claim 9, wherein the portable controller reports the occurrence of the reportable event via cellular telephone based Short Messaging Service (SMS).

12. The event reporting system of claim 11, wherein the occurrence of the reportable event is reported in the form of a discrete SMS message presented on the screen of a wireless device used by the consumer.

13. The event reporting system of claim 9, wherein the portable controller reports the occurrence of the reportable event via a data connection over commercially available wireless communication service's data channels.

14. The event reporting system of claim 9, wherein the occurrence of the reportable event is reported in the form of a discrete text message presented on the screen of a consumer's wireless device.

15. The event reporting system of claim 9, wherein the portable controller reports the occurrence of the reportable event to the consumer via email conveyed wirelessly from the event reporting system.

16. The event reporting system of claim 9, wherein the occurrence of the reportable event is reported in the form of spoken words created by conversion of alarm data into audio synthesized speech.

17. The event reporting system of claim 16, wherein the portable controller uses a voice channel telephone call to report the occurrence of the reportable event.

18. The event reporting system of claim 10, wherein, in response to a communication from a mobile device matching the stored CLID, the portable controller accepts the message to access and re-configure the event reporting system.

19. The event reporting system of claim 9, wherein the portable controller is configured to authenticate the consumer's identity by interpreting data messages conveyed from the consumer's cellular telephone via DTMF tone sequences entered by the consumer.

20. The event reporting system of claim 9, wherein the portable controller is further configured to register a passcode for remotely accessing the controller.

21. The event reporting system of claim 20, wherein the portable controller is further configured to authenticate the consumer's identity via speech recognition of the pass-code.

22. An event reporting system, comprising:
a portable controller comprising an operational identity that identifies a predetermined amount of prepaid event reporting services that is pre-associated with the event reporting system; and
a short-range wireless event detector communicatively coupled to the portable controller, configured to generate an event report responsive to an event associated with a security breach,
wherein the portable controller is configured to:
communicate over a network with a remote monitoring station;
responsive to communicating with the remote monitoring station, trigger:
determining, at the remote monitoring station, the predetermined amount of prepaid services that is pre-associated with the portable controller through a look up based on the operational identity, and
activating, by the remote monitoring station, the predetermined amount of prepaid service that is pre-associated with the portable controller;
report reportable events directly to a consumer who has purchased the controller without prior communication with the remote monitoring station based on consumer information stored in a memory of the portable controller;
report reportable events to the consumer for a predetermined period of time without requiring a billing identity to be created by the consumer with the remote monitoring station; and
purchase an additional amount of prepaid services.

23. The event reporting system of claim 22, wherein the occurrence of the reportable event is reported using alarm-industry, standard tone sequences within the audio channel of cellular telephony.

24. The event reporting system of claim 22, wherein the occurrence of the reportable event is reported using data representations of alarm industry data formats conveyed via the SMS data channel of cellular telephony.

25. The event reporting system of claim 22, wherein the occurrence of the reportable event is reported using data representations of alarm industry data formats conveyed via data connection over commercially available wireless communication data channels.

26. The event reporting system of claim 22, wherein the one or more event detectors are industry-standard, short-range wireless sensors comprising at least one of the following: temperature detectors, door/window opening detectors, glass breakage detectors, and motion detectors.

27. The event reporting system of claim 22, wherein the portable controller comprises a LCD and keypad through which the event reporting system may be configured at the initial power-up of the controller.

28. The event reporting system of claim 22, wherein the portable controller is configured to store a calling line ID ("CLID") for remotely configuring the event reporting system.

29. The event reporting system of claim 28, wherein the portable controller is configured to recognize the CLID of a consumer's cellular telephone such that the consumer can configure the event reporting system via SMS messages conveyed from the consumer's cellular telephone over the data channels of the serving cellular system.

30. The event reporting system of claim 28, wherein the portable controller performs authentication of the consumer's identity by recognition of the CLID of the consumer's mobile telephone.

31. The event reporting system of claim 22, wherein the portable controller is configured to accept a pass-code from the consumer for remotely accessing the event reporting system.

32. The event reporting system of claim 31, wherein the portable controller is configured to perform authentication of the consumer's identity by interpreting data messages conveyed from the consumer's mobile telephone via DTMF tone sequences entered by the consumer.

33. The event reporting system of claim 31, wherein the portable controller is configured to perform authentication of the consumer's identity via speech recognition of the pass-code previously registered by the consumer.

34. The event reporting system of claim 22, wherein the period of time for reporting reportable events using the portable controller may be extended by the consumer by purchasing pre-paid usage cards.

* * * * *